US011427347B2

(12) United States Patent
Gut et al.

(10) Patent No.: US 11,427,347 B2
(45) Date of Patent: Aug. 30, 2022

(54) CABIN INTERIOR ARRANGEMENT COMPRISING A POWER TRANSFER ARRANGEMENT FOR AN AIRCRAFT, AND AIRCRAFT COMPRISING THE CABIN INTERIOR ARRANGEMENT

(71) Applicant: Diehl Aerospace GmbH, Ueberlingen (DE)

(72) Inventors: Tobias Gut, Ueberlingen (DE); Martin Richter, Fuerth (DE); Benno Petersen, Herdwangen (DE)

(73) Assignee: Diehl Aerospace GmbH, Ueberlingen (DE)

(*) Notice: Subject to any disclaimer, the term of this patent is extended or adjusted under 35 U.S.C. 154(b) by 0 days.

(21) Appl. No.: 17/119,324

(22) Filed: Dec. 11, 2020

(65) Prior Publication Data
US 2021/0179287 A1    Jun. 17, 2021

(30) Foreign Application Priority Data
Dec. 11, 2019    (DE) .......................... 102019008569.8

(51) Int. Cl.
*B64D 41/00*    (2006.01)
*B64D 11/06*    (2006.01)
(Continued)

(52) U.S. Cl.
CPC ............... *B64D 41/00* (2013.01); *B60Q 3/41* (2017.02); *B64D 11/0646* (2014.12); *H02J 4/00* (2013.01); *H02J 50/30* (2016.02); *B64D 2221/00* (2013.01)

(58) Field of Classification Search
None
See application file for complete search history.

(56) References Cited

U.S. PATENT DOCUMENTS 9,653,949 B2      5/2017   Alpert et al.
2007/0057121 A1*  3/2007   Callahan .................. H02G 3/00
                                                   244/118.5
(Continued)

FOREIGN PATENT DOCUMENTS

DE      3242978 A1      5/1984
DE   102010018896 A1   11/2011
DE   102012217808 A1    4/2014

*Primary Examiner* — Jared Fureman
*Assistant Examiner* — Joel Barnett
(74) *Attorney, Agent, or Firm* — Scully Scott Murphy and Presser (57) ABSTRACT

A cabin interior arrangement 1 for an aircraft is proposed that comprises a first cabin interior object and a second cabin interior object 3a, b, comprising a power transmitting device 5 for transmitting power from an aircraft electrical system 7, wherein the power transmitting device 5 is arranged on the first cabin interior object 3a, comprising a power receiving device 6 for receiving the power from the power transmitting device 5, wherein the power receiving device 6 is arranged on the second cabin interior object 3b, wherein the power transmitting device 5 and the power receiving device 6 are embodied as a power transfer arrangement 2 for supplying the power to a mobile terminal 4, wherein the power transmitting device 5 and the power receiving device 6 are designed to transfer power over a distance of several centimetres, wherein the power transmitting device 5 and the power receiving device 6 are deigned to set up a wireless and/or cordless supply connection segment 10 between the power transmitting device 5 and the power receiving device 6. In addition, an aircraft is proposed that comprises the cabin interior arrangement 1 comprising the power transfer arrangement 2 for supplying power to the terminal 4.

7 Claims, 4 Drawing Sheets

(51) Int. Cl.
*H02J 4/00* (2006.01)
*H02J 50/30* (2016.01)
*B60Q 3/41* (2017.01)

(56) References Cited

U.S. PATENT DOCUMENTS

| | | | |
|---|---|---|---|
| 2010/0285747 A1* | 11/2010 | Bauer | H02J 5/005 |
| | | | 455/41.1 |
| 2011/0266392 A1 | 11/2011 | Goehlich et al. | |
| 2014/0215534 A1* | 7/2014 | Meckes | B64D 11/00 |
| | | | 725/75 |
| 2015/0061380 A1* | 3/2015 | Schomacker | B63B 17/00 |
| | | | 307/9.1 |
| 2015/0248660 A1 | 9/2015 | Muirhead | |
| 2016/0049831 A1* | 2/2016 | Nakano | H02J 50/80 |
| | | | 307/104 |
| 2019/0064353 A1* | 2/2019 | Nugent, Jr. | H02J 50/30 |
| 2019/0132056 A1 | 5/2019 | Golan et al. | |

* cited by examiner

CABIN INTERIOR ARRANGEMENT COMPRISING A POWER TRANSFER ARRANGEMENT FOR AN AIRCRAFT, AND AIRCRAFT COMPRISING THE CABIN INTERIOR ARRANGEMENT

BACKGROUND OF THE INVENTION

The present invention relates to a cabin interior arrangement for an aircraft and to an aircraft comprising the cabin interior arrangement.

DISCUSSION OF THE PRIOR ART

Air passengers are increasingly bringing for entertainment on flights mobile devices, in particular smartphones or tablets, that need to be supplied with electrical power and data during a flight. For instance air passengers can charge their smartphone via a USB cable connection at a cable connection point on their passenger seat, and receive data from a wireless network in the aircraft. Supplying electrical power to mobile devices in this manner is achieved via a power distribution system of the aircraft, for instance with each air passenger being connected to the power distribution system via a cable.

Using a laser beam for power transfer is known from a different technical application field, namely supplying power for domestic use. For example, U.S. Publication No. 2019/132056 A1 shows a system for optical wireless power transfer to at least one power receiving apparatus. In particular, the document shows using a laser-based transfer system for transferring optical power in a domestic environment to a mobile electronic device.

U.S. Pat. No. 9,653,949 shows a method for ensuring safe operation of a power transfer system, in particular of a laser transmitter for power transfer in a room of a building. The method shows, for example, a receiver for receiving the power from the laser transmitter and for converting into electrical power. In particular, the method relates to the wireless transfer of power to a remote device across free space, in particular by means of a laser-like system.

DE 10 2012 217 808 A1, which arguably constitutes the closest prior art, shows a communications system for an aircraft, wherein the aircraft comprises a central data processing device, and the communication system comprises at least one communication terminal, which is assigned to a specific seat in the aircraft and comprises a wireless and/or wired data link to the central data processing device. In particular, the communication system is designed for communicating payment data with a passenger device. The communication system comprises a separate, wired power supply connection for the passenger device at one or more seats, and is designed to switch the power supply connection on or off and/or to detect the amount of energy for said power supply connection.

SUMMARY OF THE INVENTION

The present invention is directed to a cabin interior arrangement that comprises an improved power supply for a mobile terminal.

More particularly, the present invention is directed to a a cabin interior arrangement for an aircraft, in particular for a passenger aircraft. The aircraft, in particular in the form of a passenger aircraft, preferably has an elongated fuselage, which preferably can be partitioned into a passenger area and a cargo area. The passenger area preferably comprises the cabin interior arrangement.

The cabin interior arrangement comprises a first cabin interior object and a second cabin interior object. The first and second cabin interior objects are preferably embodied as separate objects in the passenger area, and are preferably spaced apart from each other. Alternatively, the first and second cabin interior objects are arranged adjacent to each other and/or joined to each other.

The cabin interior arrangement preferably comprises a multiplicity of cabin interior objects, which are arranged in the aircraft or in the passenger area for instance for covering, furnishing, supply and/or safety purposes. For example, the first cabin interior object is in the form of a luggage compartment, a luggage compartment cover, a cabin ceiling panel or a kitchen module and/or toilet module. The first cabin interior object is preferably in the form of a passenger service unit or an overhead duct for the passenger service unit.

The second cabin interior object is in the form of a wall panel or a cabin floor element, for example. The second cabin interior object is preferably in the form of a passenger seat or a seat frame of the passenger seat. For instance, the second cabin interior object is in the form of an armrest or a headrest of the passenger seat for use by a passenger.

The cabin interior arrangement comprises a power transmitting device for transmitting power, in particular electrical power, from an aircraft electrical system. The aircraft electrical system is preferably designed as an onboard power distribution system to supply electrical power to aircraft components. For instance, electrical power is supplied to loads in the passenger area by means of the aircraft electrical system.

The power transmitting device is arranged on the first cabin interior object. In particular, the power transmitting device is integrated in the first cabin interior object and/or is a component of the first cabin interior object. The power transmitting device is connected to the aircraft electrical system so that the power transmitting device can take the electrical power from the aircraft electrical system as required.

The cabin interior arrangement comprises a power receiving device for receiving the power from the power transmitting device. The power receiving device is arranged on the second cabin interior object. In particular, the power receiving device is integrated in the second cabin interior object and/or is a component of the second cabin interior object. The power receiving device receives the power from the aircraft electrical system so that preferably the second cabin interior object can be supplied with power from the aircraft electrical system. For example, cabin interior objects that have no power supply by the aircraft electrical system in the form of a cable connection, for instance, can be connected to the aircraft electrical system by the power transmitting device and the power receiving device.

The power transmitting device and the power receiving device are embodied as a power transfer arrangement for supplying the power to a mobile terminal. The power transfer arrangement is preferably designed to convey power over a path, in particular a path in the passenger area, where in particular the power can be conveyed to the terminal. The mobile terminal is preferably in the form of a smartphone, a tablet, a notebook and/or a power bank, and is preferably designed for use for a passenger. For example, a plurality of terminals are used in the passenger area simultaneously by one or more passengers during a flight, and these terminals for use by the passenger can be supplied with power. The terminal can preferably be considered as an electrical load that consumes and/or is able to consume the power.

The power transmitting device and the power receiving device are designed to transfer power over a distance of several centimetres. In particular, the power can be transferred from the aircraft electrical system by means of the power transmitting device to the power receiving device over a distance of at least 10 cm, particularly over a distance of at least 15 cm.

According to the present invention, the power transmitting device and the power receiving device are designed to set up a wireless and/or cordless supply connection segment between the power transmitting device and the power receiving device. The power for supplying power to the terminal is preferably transferred optically between the power transmitting device and the power receiving device.

The wireless and/or cordless supply connection segment is preferably in the form of an optical power transfer segment. The power transmitting device is preferably designed to transmit electromagnetic waves, wherein the power receiving device is preferably designed to receive the electromagnetic waves and is designed to convert electromagnetic waves into electrical power for supplying power to the terminal. The power transmitting device and the power receiving device set up the supply connection segment preferably in an open space in the aircraft, with clear transfer of the power possible over the distance of several centimetres, preferably up to a few metres. In particular, the power transmitting device is aimed at the power receiving device for the purpose of optical power transfer, and the power receiving device comprises a receiving area for receiving the power. The power transmitting device preferably emits the power in the form of electromagnetic waves, which are aimed onto the receiving area of the power receiving device.

In particular, the wireless and/or cordless supply connection segment is in the form of a direct and/or straight link between the power transmitting device and the power receiving device. In particular, the power transmitting and power receiving devices are designed to set up the wireless and/or cordless supply connection segment with precision, with the power transmitting device transmitting the power preferably targeted onto the second cabin interior object and/or the power receiving device. For example, the supply connection segment is in the form of a point-to-point link between the power transmitting device and the power receiving device. In particular, the power transmitting device confines the power to a transmission region, which transmission region is a surface segment of the second cabin interior object and/or of the power receiving device. In particular, the surface segment has a maximum diameter and/or a maximum diagonal length of less than 20 cm, in particular less than 10 cm, more particularly less than 5 cm.

The cabin interior object advantageously provides the mobile terminal with a power supply that by virtue of the freedom in positioning the power transmitting device and power receiving device constitutes an improved power supply for the terminal. It is also advantageous that cabin interior objects that have no dedicated connection to the aircraft electrical system can be supplied with power, with the result that an inexpensive cabin interior arrangement is created that has a power supply for the terminal. Thus a separate cable connection to the individual cabin interior objects is unnecessary, and it is possible to implement the cabin interior arrangement economically. The second cabin interior object is preferably in the form of a passive and/or uncabled cabin interior object. For instance, the second cabin interior object is decoupled and/or isolated from the aircraft electrical system. It is also advantageous that the power can be transferred wirelessly and/or cordlessly over a distance of more than one metre, and any point in the passenger cabin and/or the aircraft can be supplied with power, thereby creating an inexpensive cabin interior facility comprising power transfer arrangement, the costs of which do not depend on the connection distance between the power transmitting device and power receiving device.

In a preferred embodiment of the invention, the power transmitting device is also designed to transfer data from an onboard data network. The onboard data network is preferably designed for data communication with the aircraft components. The power transmitting device emits the data from the onboard data network preferably in the form of an optical signal, in particular electromagnetic waves. The power receiving device is designed to receive the data from the power transmitting device. In particular, the power receiving device receives the optical signal, and the wireless and/or cordless supply connection segment is designed for data transfer. The power receiving device receives the optical signals from the power transmitting device and preferably converts the optical signals into electrical signals.

The power and the data from the aircraft electrical system and the onboard data network can preferably be transferred jointly via the wireless and/or cordless supply connection segment. The power and the data are preferably transferred by means of a pulse transmission technique. For example, the power transmitting device transmits the power in pulses to the power receiving device, and the data can be transferred jointly with the power from a pulse train. The power receiving device is preferably designed to receive the pulse train. The power receiving device is preferably designed to interpret the pulse train as data from the onboard data network. Pulses shall preferably be understood to mean a single time-limited power waveform, in particular a single time-limited current, voltage or power waveform. Power and data can be transferred jointly by means of the pulse transmission technique. It is advantageous that the power transmitting device and the power receiving device transfer power and data by a single link setup, without the need to set up an additional link segment for the data transfer, hence creating an inexpensive cabin interior arrangement comprising power transfer arrangement for supplying power to the terminal.

In a preferred embodiment of the invention, the power transfer arrangement comprises an interface device for coupling to the mobile terminal. The interface device is preferably designed to be coupled by the passenger to the terminal, in particular to the smartphone, the tablet, the notebook and/or the power bank. The interface device preferably has a plurality of coupling methods available for connection to the one or more terminals.

The interface device is connected to the power receiving device for the purpose of power transfer. The interface device is linked to the aircraft electrical system via the power receiving device and the power transmitting device, and the power from the aircraft electrical system can be transferred to the interface device via the supply connection segment. The interface device is designed to supply the terminal with the power from the aircraft electrical system. In particular, the terminal can be connected by means of a wired coupling method, for instance a USB-standard cable connection, to the interface device for the purpose of supplying power. For example, a rechargeable battery of the terminal can be charged at the interface device, with the electrical power provided and/or able to be provided via the power transmitting device and the power receiving device.

The interface device is preferably on the second cabin interior object. The power receiving device and the interface device are preferably arranged in a shared portion of the second cabin interior object. The power receiving device and the interface device are preferably integrated in the second cabin interior object inside the shared portion. Alternatively or optionally additionally, the cabin interior arrangement comprises a third cabin interior object, and the interface device is preferably arranged on the third cabin interior object. The second and third cabin interior objects are preferably joined and/or arranged adjacent to each other, with the first cabin interior object spaced apart from the second and third cabin interior objects.

Optionally additionally, the interface device is connected to the power receiving device for the purpose of data transfer. The interface device is preferably in the form of a data interface device that has one or more data transfer methods. The interface device is designed to transfer the data from the onboard data network via the supply connection segment to the terminal. The terminal is preferably coupled for the purpose of data communication with the interface device via a wired or unwired connection. For example, the interface device transfers the data to the terminal by means of the USB-standard cable connection. Alternatively or optionally additionally, the interface device can transfer the data from the onboard data network to the terminal via a wireless data communication method, for instance a wireless network, in particular a WLAN-standard wireless network. Alternative wireless methods of data communication by the interface device with the terminal are, for example, a Bluetooth connection, a near-field communication (NFC) connection or an inductive coupling connection.

The power transmitting device preferably transmits power and data from the aircraft electrical system and onboard data network to the power receiving device, with the wireless and/or cordless supply connection segment is designed to convey the power and the data, and therefore the interface device connected to the power receiving device is designed to supply power and/or for data communication with the terminal.

In a preferred structural embodiment of the invention, the first cabin interior object is in the form of a, or the, passenger service unit. The passenger service unit (PSU) is preferably in the form of an indicator and/or control panel for the passenger, and is preferably arranged above the passenger seat and/or a row of passenger seats. The PSU is connected to the aircraft electrical system for supplying power. The PSU comprises the power transmitting device for transmitting the power from the aircraft electrical system. The power transmitting device is preferably integrated in the PSU and/or is a component of the PSU. In particular, the power transfer arrangement is in the form of an optical wireless remote charging system, and the power transmitting device of the optical wireless remote charging system is arranged on the PSU, and/or the PSU is equipped with the power transmitting device. The PSU in its basic form is preferably a panel and/or a planar element, and the power transmitting device can be arranged in any position on the PSU. The power transmitting device is preferably aimed at the power receiving device, and the power can be transferred from the direction of the PSU towards the second cabin interior object. It is advantageous that the power transmitting device uses the existing power supply to the PSU by the aircraft electrical system in order to transmit power wirelessly and/or cordlessly via the power receiving device and the interface device to the terminal, hence creating an improved power supply for the terminal by the cabin interior arrangement.

Alternatively or additionally, the PSU is connected to the onboard data network, with the power transmitting device preferably transmitting data from the onboard data network or data from the PSU to the power receiving device wirelessly and/or cordlessly. For example, data from the PSU, e.g. a seat-belt sign signal, can be communicated with the terminal, and the terminal reproduces the data from the PSU or from the onboard data network as an output device, e.g. on a display of the terminal. Additional data for communicating between the onboard data network or the PSU and the terminal is preferably journey data information, e.g. flight duration or cruising altitude, temperature data and available services, in-flight catering information, price lists, advertisements or available entertainment such as films or e-books.

It is specifically provided that the passenger service unit comprises a lighting device. The lighting device is preferably in the form of a seat light for illuminating the passenger seat and/or the row of passenger seats. The lighting device is preferably in the form of a light emitting diode device comprising a plurality of light emitting diodes. The power transmitting device is integrated in the lighting device. In particular, the lighting device and the power transmitting device are embodied as a combined component of the PSU. For example, by integrating the power transmitting device in the lighting device, only the lighting device is apparent to the passenger. It is advantageous that in order to retrofit the PSU with the power transmitting device, there is, and/or may be, no need for any costly replacement of the entire PSU.

In a preferred embodiment of the invention, the second cabin interior object is in the form of a passenger seat. The second cabin interior object is optionally in the form of a row of passenger seats. The power receiving device is arranged on the passenger seat. The interface device is preferably connected to the power receiving device on the passenger seat. The power receiving device is preferably arranged on an external surface of the passenger seat and oriented towards the power transmitting device. The receiving area of the power receiving device is preferably arranged on the external surface of the passenger seat so that the power transmitting device transmits the power wirelessly and/or cordlessly onto the receiving area.

Preferably, the power transmitting device is arranged on the PSU and the power receiving device is arranged on the passenger seat, with the power transmitting and power receiving devices designed to set up the wireless and/or cordless supply connection segment so that the PSU supplies the passenger seat with power for supplying power to the terminal. Advantageously, electrical power can be supplied to the passenger seat in a straightforward manner by means of the power transmitting and power receiving devices, so that the cabin interior arrangement allows flexibility in the placement of the passenger seats. For example, seat rows are accommodated in the passenger area such that they can be repositioned and/or moved, and the power transmitting device is accommodated on the PSU in an orientable manner in order to set up the wireless and/or cordless supply connection segment. The power transmitting device is preferably pivotably accommodated on the PSU, so that the power transmitting device can be oriented towards the power receiving device.

In another specific instance of the invention, the passenger seat comprises an armrest. The row of passenger seats optionally comprises one or more armrests. The armrests are preferably hinged on the passenger seat. The armrest preferably has a placement surface which is designed to support a passenger arm and/or for placement of the terminal.

The interface device is integrated in the armrest. The power receiving device is preferably arranged on the armrest. The receiving area of the power receiving device is preferably arranged on the placement surface of the armrest. Alternatively, the power receiving device is arranged on any point of the seat and is connected to the interface device in the armrest. For example, a cable connection between the power receiving device and the interface device is designed for the supply of power.

The interface device is integrated in the armrest of the passenger seat, and the interface is designed to be able to connect to the terminal. The interface preferably comprises one or more connector sockets for connecting to the terminal by a cable, with the connector sockets arranged in the armrest. The passenger is able to supply power, in particular electrical power, to the terminal using a cable connection, e.g. USB cable, via the connector socket, in particular a USB socket, on the armrest of the passenger seat.

Alternatively or optionally additionally, the interface device comprises an induction charging device for contactless power transfer to the terminal. The induction charging device is preferably integrated in the armrest of the passenger seat, and the terminal can be supplied with power in a contactless manner at a close range of several millimetres up to a few centimetres from the induction charging device. The armrest preferably comprises a receptacle segment, in particular a charging tray, for placement of the terminal, in which receptacle segment the terminal can be supplied with power in a contactless manner by the induction charging device.

Alternatively or optionally additionally, the passenger seat comprises a placement device, with the induction charging device arranged on the placement device of the passenger seat. The placement device is in the form of a folding table, for instance, with the induction charging device integrated in the folding table. When in place on the folding table, the terminal can preferably be supplied with power in a contactless manner.

In a further preferred embodiment of the invention, the power transmitting device and the power receiving device are designed to set up a wireless free-space transmission segment as the supply connection segment. The wireless free-space transmission segment can be set up in the open space in the passenger area, in particular so that the distance between the first cabin interior object and the second cabin interior object can be spanned across the open space. The free-space transmission segment is in the form of a, or the, point-to-point link between the power transmitting device and the power receiving device. The point-to-point link is preferably in the form of a direct link between the power transmitting device and the power receiving device. The direct link is preferably formed by the directional transmission by the power transmitting device onto the receiving area of the power receiving device.

A plurality of transmission methods are possible for setting up a wireless free-space transmission segment. For example, the power transmitting device is in the form of a directional radio device, and the power receiving device is in the form of a radio wave receiver, with the directional radio device and the radio wave receiver designed to set up the wireless free-space transmission segment. The power and/or data are transferred by means of radio waves.

Alternatively, the wireless free-space transmission segment can be set up by means of laser light technology, which is described as follows.

In a preferred embodiment of the invention, the power transmitting device is in the form of a laser light source for generating a laser light beam for transmitting the power. The laser light source transmits the laser light beam towards the power receiving device. The laser light source generates the laser light beam using electrical power from the aircraft electrical system, and the power receiving device is preferably designed to convert the laser light beam into electrical power. In particular, the wireless and/or cordless supply connection segment shall be understood to be the laser light beam that can be set up between the laser light source and the power receiving device.

The laser light source is preferably designed to transfer data from the onboard data network and/or data from the PSU. In particular, the laser light beam transfers data in the form of a light signal that is embodied as the optical signal. The light signal can preferably be received by the power receiving device. A line-of-sight preferably exists between the laser light source and the power receiving device. A line-of-sight is understood to mean an unrestricted link from the laser light source to the power receiving device across the open space.

The laser light source is preferably arranged on the PSU. The PSU preferably comprises the lighting device, with the laser light source integrated in the lighting device. For example, the lighting device illuminates a seating area and/or the passenger seat in the aircraft and simultaneously transmits the power from the aircraft electrical system to the power receiving device. The laser light source is preferably in the form of a laser diode. The lighting device preferably comprises the light emitting diode for the illumination and the laser diode for generating the laser light beam.

In a specific instance of the invention, the power receiving device is in the form of a photocell device for converting the laser light beam into electrical power. The photocell device is preferably embodied as one or more photovoltaic cells. The photocell device preferably comprises a surface segment for receiving the laser light beam, which surface segment is embodied as the receiving area for receiving the power. The photocell device is preferably oriented towards the laser light source in order to receive the power. The photocell device is preferably arranged on the second cabin interior object such that it is orthogonal to the laser light beam. In particular, the surface segment of the photocell device is designed to be orthogonal to the laser light beam so that the photocell device can receive and convert the transmitted power from the laser light source with minimum possible losses.

Alternatively or optionally additionally, the photocell device is designed to receive data in the form of light signals, in particular in the form of digital signal pulses of the laser light beam. The photocell device preferably comprises an optical device for focusing the laser light beam and/or the light signals, and an optoelectric transducer for converting the light signals into electrical signals. The optical device is connected to the optoelectric transducer, so that the laser light beam when incident on the photocell device is, and/or can be, focused by the optical device, and is, and/or can be, passed to the optoelectric transducer for conversion into electrical signals.

The photocell device is preferably arranged on the passenger seat, in particular on the armrest. The surface segment of the photocell device is preferably formed on the placement surface of the armrest in order to receive the laser light beam. By virtue of the precise orientation of the laser light beam, the photocell device advantageously has a small surface area, in particular a surface area of several millimetres up to a few centimetres, hence creating a cabin interior arrangement comprising a power receiving device that can be arranged on the second cabin interior object in a space-saving manner.

The laser light source preferably transmits power and data from the aircraft electrical system and onboard data network to the photocell device, said laser light source preferably being arranged on the PSU and said photocell device preferably being arranged on the passenger seat, where the laser light beam is designed to convey the power and the data, and therefore the interface device connected to the photocell device is designed to supply power and/or for data communication with the terminal.

The present invention further relates to an aircraft, in particular a passenger aircraft, which comprises the cabin interior arrangement comprising the power transfer arrangement for supplying power to the terminal, as described above. The aircraft preferably has an elongated fuselage, which preferably can be partitioned into a passenger area and a cargo area. The passenger area preferably comprises the cabin interior arrangement comprising the power transfer arrangement for supplying power to the terminal.

BRIEF DESCRIPTION OF THE DRAWINGS

Further features, effects and advantages of the invention appear in the following description of a preferred exemplary embodiment of the invention and in the accompanying figures, in which.

DETAILED DESCRIPTION OF THE INVENTION

Figure 1:
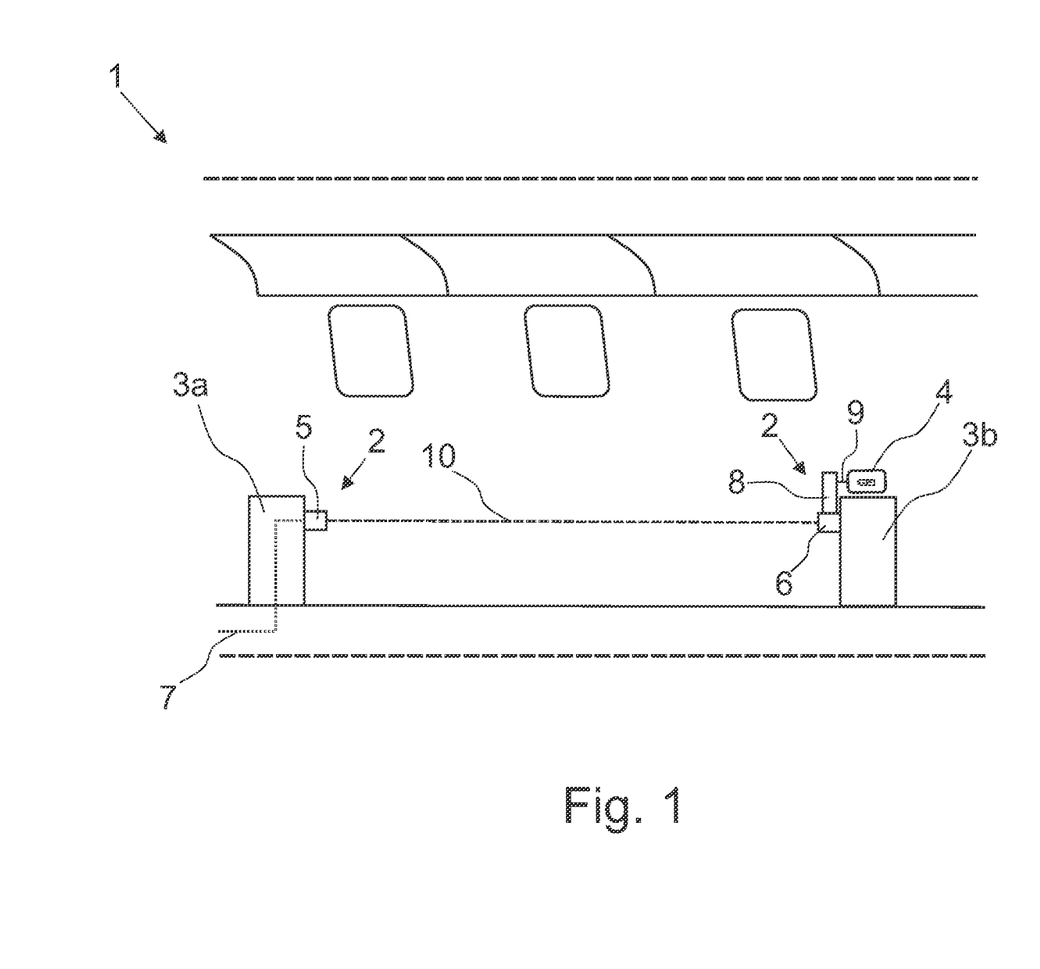
FIG. 1 shows in a schematic diagram a cabin interior arrangement comprising a power transmitting device for an aircraft.

FIG. 1 shows a cabin interior arrangement 1 for an aircraft, for instance for a passenger area of an aircraft. The cabin interior arrangement 1 comprises a first cabin interior object and a second cabin interior object 3a,b. The two cabin interior objects 3a,b are arranged in the aircraft or in the passenger space. For instance, the first cabin interior object 3a is in the form of a galley module or a lavatory module and is permanently connected to an aircraft structure. The second cabin interior object 3b is arranged in the aircraft spaced apart from the first cabin interior object 3a. For instance, the first and second cabin interior objects 3a, b are spaced by several metres. The second cabin interior object 3b is, for example, in the form of a placement device, e.g. a cabinet or shelf, for a terminal 4, e.g. a smartphone.

The cabin interior arrangement 1 comprises a power transfer arrangement 2 for supplying power to the terminal 4. The power transfer arrangement 2 comprises a power transmitting device 5 and a power receiving device 6. The power transmitting device 5 is designed to transmit power from an aircraft electrical system 7, and the power receiving device 6 is deigned to receive the power from the power transmitting device 5. The aircraft electrical system 7 is in the form of a power source, e.g. an electrical power source, for the power transmitting device 5 and other aircraft components. The aircraft electrical system 7 is formed, for instance, by a wiring harness structure in the aircraft.

The power transmitting device 5 is arranged on the first cabin interior object 3a, and the power receiving device 6 is arranged on the second cabin interior object 3b. The power transmitting device 5 and the power receiving device 6 are spaced apart from each other in the aircraft. For example, the power transmitting and power receiving devices 5,6 are spaced apart by several metres.

The power transfer arrangement 2 comprises an interface device 8 for coupling to the terminal 4. The interface device 8 is connected to the power receiving device 6, and the power receiving device 6 is designed to transfer the power to the interface device 8. The interface device 8 can be coupled to one or more terminals 4, where a coupling connection 9 between the interface 8 and the terminal 4 transfers the power. For example, the terminal 4 comprises a rechargeable battery which can be charged via the interface device 8 and the coupling connection 9.

The power transmitting and power receiving devices 5,6 are designed to set up a wireless and/or cordless supply connection segment 10. The wireless and/or cordless supply connection segment 10 is shown in FIG. 1 as a line indicated between the power transmitting device and power receiving device 5,6. The line depicts a direct link between the power transmitting device and power receiving device 5,6, and the power from the aircraft electrical system 7 for supplying power to the terminal 4 can be transferred by means of the wireless and/or cordless supply connection segment 10. For instance, the supply connection segment 10 is in the form of a wireless and/or cordless free-space transmission segment, which can be set up in free space as a direct optical link between the power transmitting device and power receiving device 5,6. The power transmitting device 5 transmits, for example, electromagnetic waves towards the power receiving device 6, where the electromagnetic waves shall be understood to be the supply connection segment 10. For example, the power transmitting device 5 is in the form of a directional radio device for generating electromagnetic waves, or in the form of a laser light source 13 for generating a laser light beam 14, or the supply connection segment 10.

Alternatively or optionally additionally, the power transmitting and power receiving devices 5,6 each comprise a transceiver which is designed for the mutual exchange of data. For example, first data from a communication node is transferred by the power transmitting device 5 via the supply connection segment 10 to the power receiving device 6, and said first data can be transferred to the terminal 4 via the interface device for processing. The terminal 4 sends back second data to the interface device 8, and the interface device 8 transmits in the opposite direction the second data via the power receiving device 6 and the power transmitting device 5 to the communication node. For instance, an Internet connection can be established for the terminal via the transceiver units of the power transmitting and power receiving devices 5,6.

Figure 2:
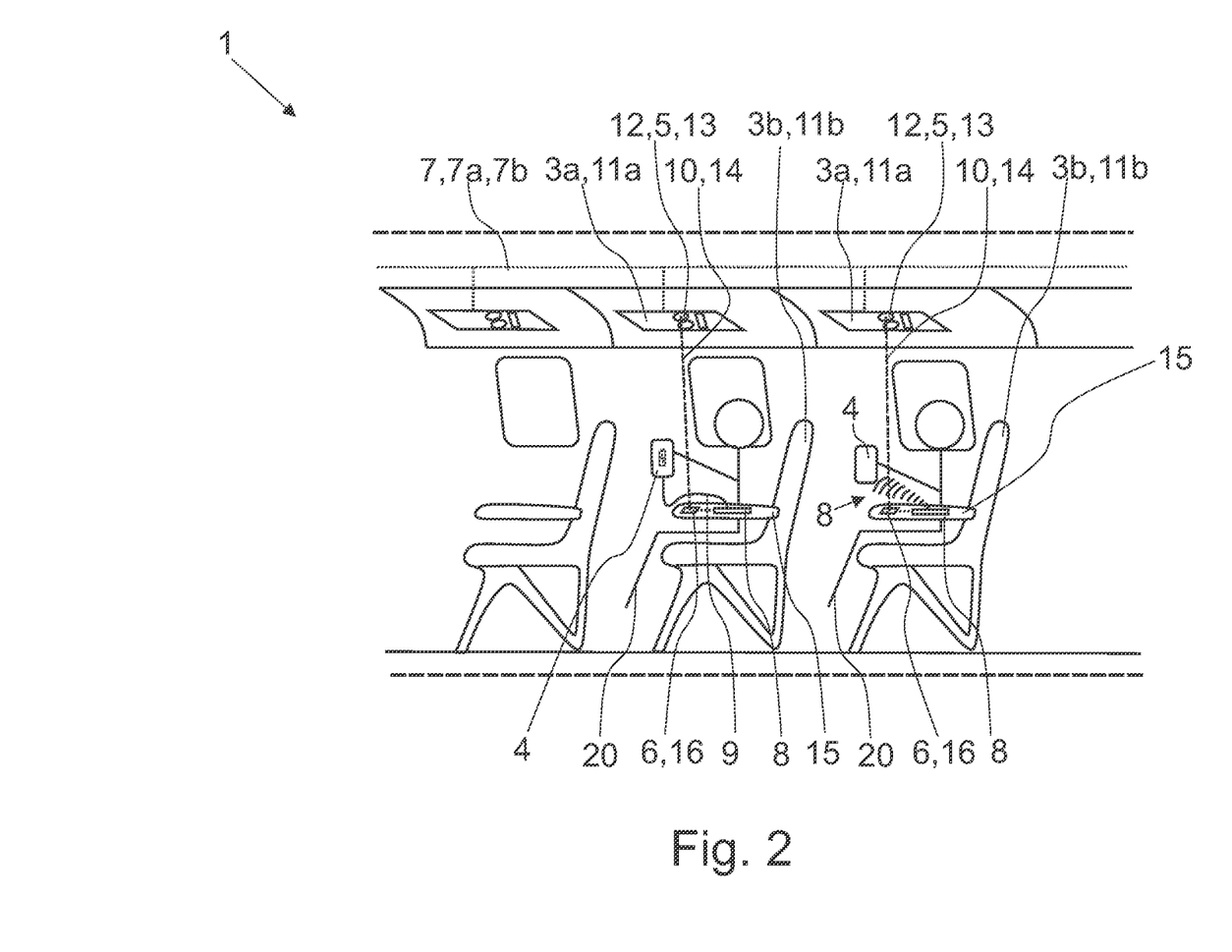
FIG. 2 shows in a schematic side view the cabin interior arrangement from FIG. 1 comprising a power transmitting device and a power receiving device as a preferred exemplary embodiment.

FIG. 2 shows the cabin interior arrangement 1 as a preferred exemplary embodiment, in which the first cabin interior object 3a is in the form of passenger service unit 11a, and the second cabin interior object 3b is in the form of a passenger seat 11b. The passenger service unit 11a (PSU)

is situated above the passenger seat 11b, and the cabin interior arrangement 1 comprises a plurality of PSUs 11a and a plurality of passenger seats 11b. The PSU 11a comprises a plurality of indicators and/or controls, e.g. seat-belt signs and/or ventilation nozzles, and the PSU 11a comprises a lighting device 12. The lighting device 12 is aimed, for example, onto a seating area for a passenger 20 and/or the passenger seat 11b for the purposes of illumination. The PSU 11a is connected to the aircraft electrical system 7 for the purpose of supplying power to the indicators and/or controls. The aircraft electrical system 7 is in the form of an onboard power distribution system 7a and an onboard data network 7b, where said onboard power distribution system and onboard data network 7a, b are designed to supply power and/or for data communication with the PSU 11a and/or other aircraft components.

The power transmitting device 5 is arranged on the PSU 11a, with the power transmitting device 5 integrated in the lighting device 12. The power transmitting device 5 is in the form of a, or the, laser light source 13 for generating a laser light beam 14, or in the form of a directional radio device for generating the electromagnetic waves. The laser light source is designed to transmit power from the aircraft electrical system 7, or from the onboard power distribution system 7a, and to transfer data from the onboard data network to the power receiving device 6.

The power receiving device 6 is arranged on the passenger seat 11b, which passenger seat 11b has an armrest 15. The armrest 15 is connected to the passenger seat 11b. For example, the armrest 15 is hinged and/or pivotably arranged on the passenger seat 11b or between two passenger seats 11b. The armrest 15 comprises the power receiving device 6, which power receiving device 6 is in the form of a photocell device 16 for receiving the power from the power transmitting device 5 or from the laser light source 13. For example, the photocell device 16 receives the laser light beam 14, and said photocell device 16 has a surface segment as a receiving area for the laser light beam 14. The surface segment is arranged on the armrest 15, and said surface segment is oriented towards the laser light source 13 for orthogonal reception of the laser light beam 14.

The power receiving device 6 or the photocell device 16 is connected to the interface device 8. The interface device 8 is arranged on the passenger seat 11b, with the interface device 8 integrated in the armrest 15. The interface device 8 is connected via a cable connection to the photocell device 16. Alternatively, the interface device 8 and the power receiving device 6 or the photocell device 16 are in the form of a combined module. The photocell device 16 transfers the power to the interface device 8, and the interface device 8 can be coupled to the terminal 4.

The interface device 8 can be coupled to the terminal 4 via the coupling connection 9, said coupling connection 9 being designed for transferring power and/or data. The coupling connection 9 is designed to connect to the one or more terminals 4 by a plurality of coupling methods. FIG. 2 shows different coupling methods as preferred exemplary embodiments, with a wired and a wireless coupling method shown in FIG. 2. For example, the coupling connection 9 is in the form of a cable connection, e.g. a USB-standard cable connection, where said cable connection connects the terminal 4 to the interface device 8 for the purpose of supplying power and/or transferring data. Electrical power and data can be transferred by the coupling methods. Alternatively or optionally additionally, the coupling connection 9 is in the form of a wireless radio link, e.g. a Bluetooth connection, NFC connection and/or a WLAN connection or a Wi-Fi direct connection, in which case solely data can be communicated between the interface device 8 and the terminal via the wireless radio link.

Figure 3:
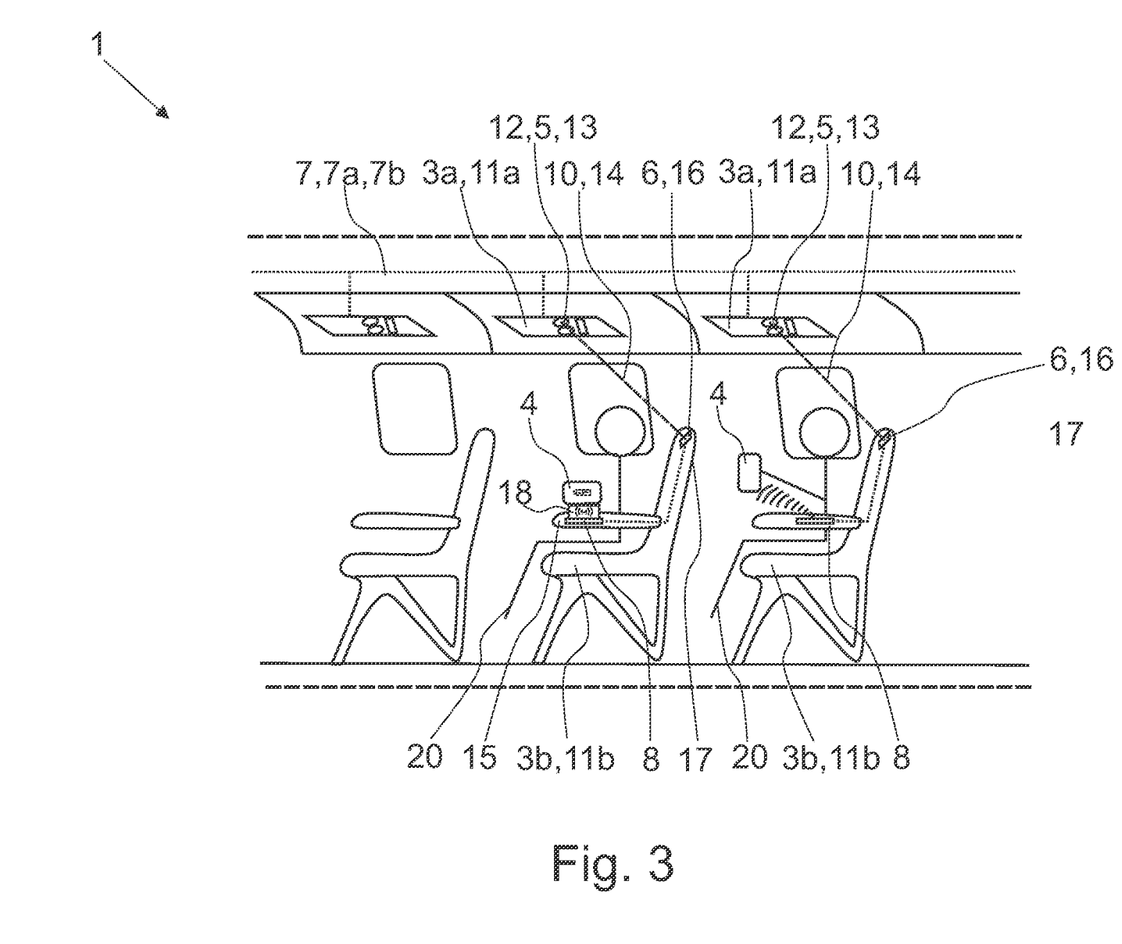
FIG. 3 shows the cabin interior arrangement from FIG. 2 comprising the power receiving device in an alternative positioning as an exemplary embodiment.

FIG. 3 shows as a further exemplary embodiment the cabin interior arrangement 1 comprising the power transmitting device 5, the power receiving device 6 and the interface device 8 in an alternative positioning. The cabin interior arrangement 1 comprises the PSU 11a and the passenger seat 11b as the first and second cabin interior objects 3a, b, with the power receiving device 6 arranged on the passenger seat 11b. The passenger seat 11b comprises a backrest segment 17, with the power receiving device 6 arranged on the backrest segment 17. The power receiving device 6 is embodied as the photocell device 16, and the laser light beam 14 is incident on the photocell device 16 for receiving the power. The power transmitting device 5 is embodied as the laser light source 13, with the laser light source arranged on the PSU 11a. The advantage with this positioning is that the laser light beam 14 during transfer of the power is not obscured by a passenger 20 or obscured only briefly by the passenger 20.

The photocell device 16 on the backrest segment 17 is connected to the interface device 8 in the armrest 15 for the purpose of transferring power and/or data. For example, the photocell device 16 is connected via a cable connection to the interface device 8.

FIG. 3 shows in addition to the alternative positioning of the power receiving device 6 a further alternative for coupling the interface device 8 to the terminal 4. The interface device 8 comprises an induction charging device 18 for contactless power and/or data transfer with the terminal 4. The terminal 4 can be positioned on the armrest 15, and the terminal 4 can be supplied with power in a contactless manner in close range of the armrest 15 by means of the induction charging device 18. Alternatively, the induction charging device 18 and/or a receptacle segment of the armrest 15 is in the form of a charging tray for placement of the terminal 4, and when arranged in the charging tray, the terminal 4 can be supplied with power and/or data in a contactless manner by means of the induction charging device 18.

Figure 4:
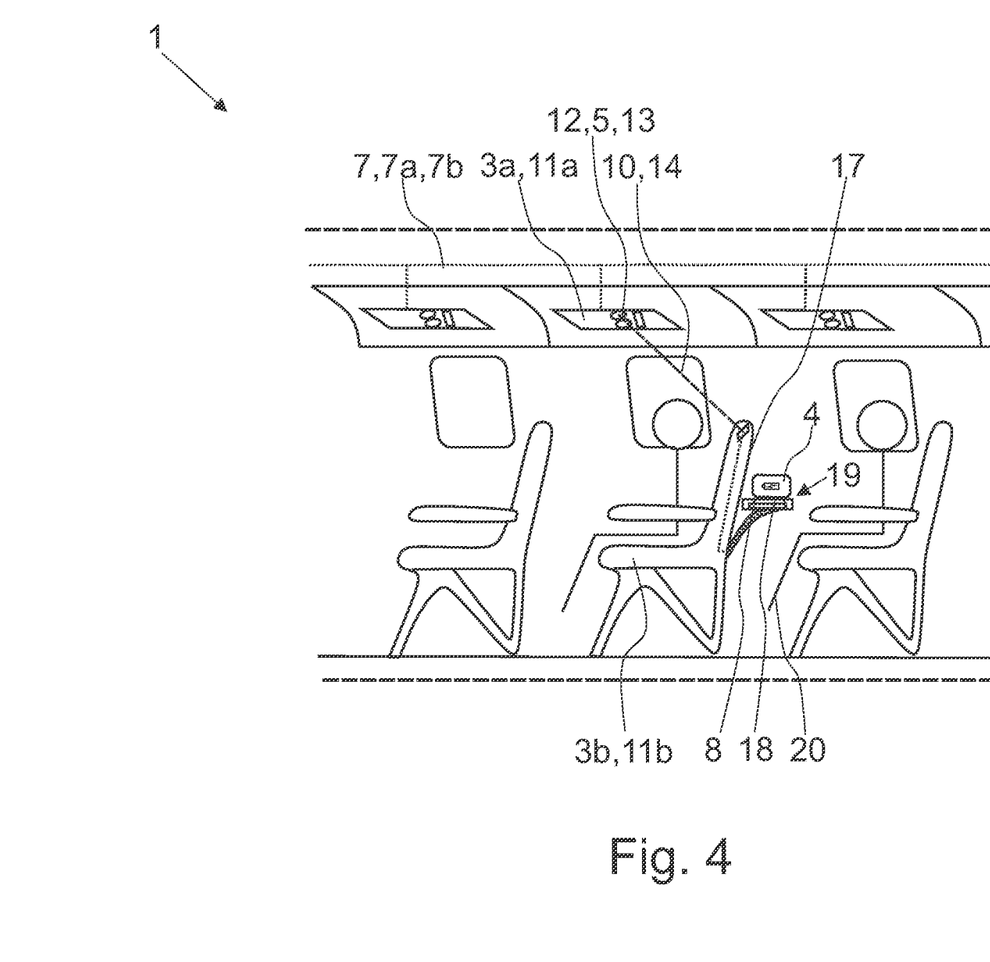
FIG. 4 shows the cabin interior arrangement from FIGS. 2 and 3 comprising an interface device in an alternative positioning as a further exemplary embodiment.

FIG. 4 shows the cabin interior arrangement 1 from FIGS. 2 and 3 having an alternative positioning of the interface device 8 and of the induction charging device 18 as a further exemplary embodiment. The cabin interior arrangement 1 comprises the PSU 11a and the passenger seat 11b as the first and second cabin interior objects 3a, b, and also the laser light source 13 and the photocell device 16 as the power transmitting and power receiving devices 5,6. The power and/or data from the onboard power distribution system and onboard data network 7a, b can be transmitted by means of the laser light beam 14 of the laser light source 13, wherein the photocell device 16 on the backrest segment 17 of the passenger seat 11b receives and transfers the power and/or data to the interface device 8.

The passenger seat 11b comprises a folding table 19, with the folding table 19 arranged on a rear surface of the backrest segment 17. The folding table 19 is designed for placement of objects belonging to the passenger 20. The folding table 19 comprises the interface device 8, with the interface device 8 integrated in the folding table 19, for instance. The interface device 8 comprises the induction charging device 18, with the induction charging device 18 integrated in the folding table 19, for instance. The interface device 8 is connected to photocell device 16 via a cable connection for the purpose of transferring the power and/or data, and when in place on the folding table 19, the terminal 4 can be supplied in a contactless manner with power and/or data via the induction charging device 18.

LIST OF REFERENCES 1 cabin interior arrangement
2 power transfer arrangement
3a first cabin interior object
3b second cabin interior object
4 terminal
5 power transmitting device
6 power receiving device
7 aircraft electrical system
7a onboard power distribution system
7b onboard data network
8 interface device
9 coupling connection
10 supply connection segment
11a passenger service unit
11b passenger seat
12 lighting device
13 laser light source
14 laser light beam
15 armrest
16 photocell device
17 backrest segment
18 induction charging device
19 folding table
20 passenger

What is claimed is:

1. A cabin interior arrangement for an aircraft, comprising a first cabin interior object and a second cabin interior object,
comprising a power transmitting device for transmitting power from an aircraft electrical system,
wherein the power transmitting device is arranged on the first cabin interior object,
comprising a power receiving device for receiving the power from the power transmitting device,
wherein the power receiving device is arranged on the second cabin interior object,
wherein the power transmitting device and the power receiving device are embodied as a power transfer arrangement for supplying the power to a mobile terminal,
wherein the power transmitting device and the power receiving device are designed to transfer power over a distance of several centimetres,
wherein
the power transmitting device and the power receiving device are designed to set up a wireless and/or cordless supply connection segment between the power transmitting device and the power receiving device,
wherein the power transmitting device is designed to transfer data from an onboard data network,
wherein the power receiving device is designed to receive the data from the power transmitting device,
wherein the power transfer arrangement comprises an interface device for coupling to the mobile terminal,
wherein the interface device is connected to the power receiving device for the purpose of power transfer,
wherein the interface device is designed to supply the terminal with the power from the aircraft electrical system, and wherein the interface device with the power receiving device is designed to transfer the data from the onboard data network to the terminal,
wherein the power transmitting device is in the form of a laser light source for generating a laser light beam for transmitting the power,
wherein the power receiving device is in the form of a photocell device for converting the laser light beam into electrical power.

2. The cabin interior arrangement according to claim 1, wherein the first cabin interior object is in the form of a passenger service unit.

3. The cabin interior arrangement according to claim 2, wherein the passenger service unit comprises a lighting device, wherein the power transmitting device is integrated in the lighting device.

4. The cabin interior arrangement according to claim 1, wherein the second cabin interior object is in the form of a passenger seat.

5. The cabin interior arrangement according to claim 4, wherein the passenger seat comprises an armrest, wherein the interface device is integrated in the armrest.

6. The cabin interior arrangement according to claim 1, wherein the power transmitting device and the power receiving device are designed to set up a wireless free-space transmission segment as the supply connection segment, wherein the freespace transmission segment is in the form of a point-to-point link between the power transmitting device and the power receiving device.

7. An aircraft characterized by the cabin interior arrangement comprising the power transfer arrangement for supplying power to the terminal according to claim 1.

* * * * *